Oct. 7, 1958
G. A. FRANK
2,855,045
WIRE HANDLING APPARATUS
Filed March 10, 1955
3 Sheets-Sheet 1
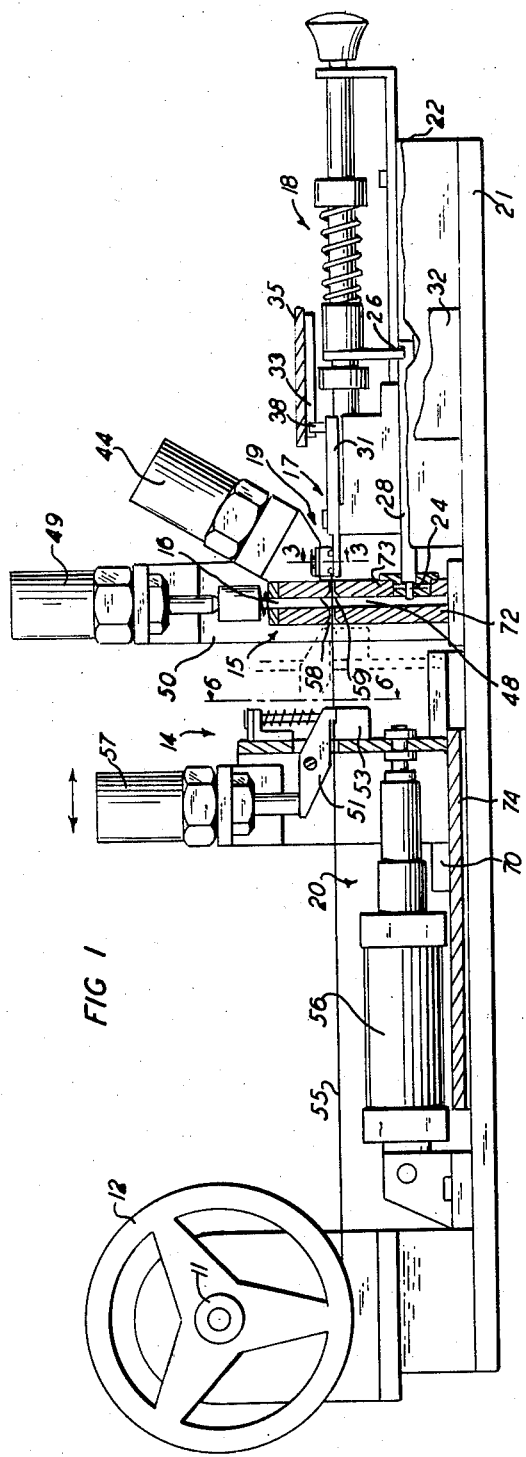
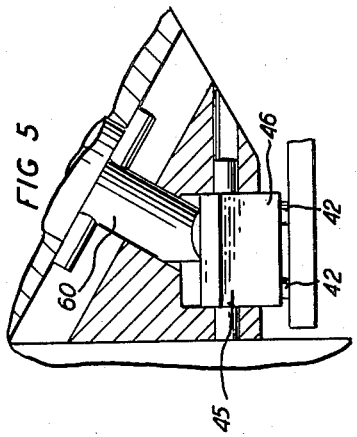
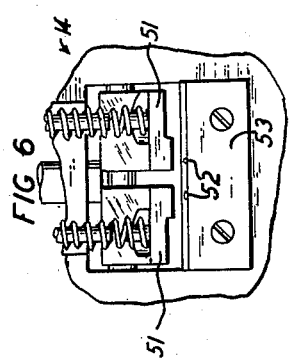
INVENTOR
G. A. FRANK
BY
ATTORNEY

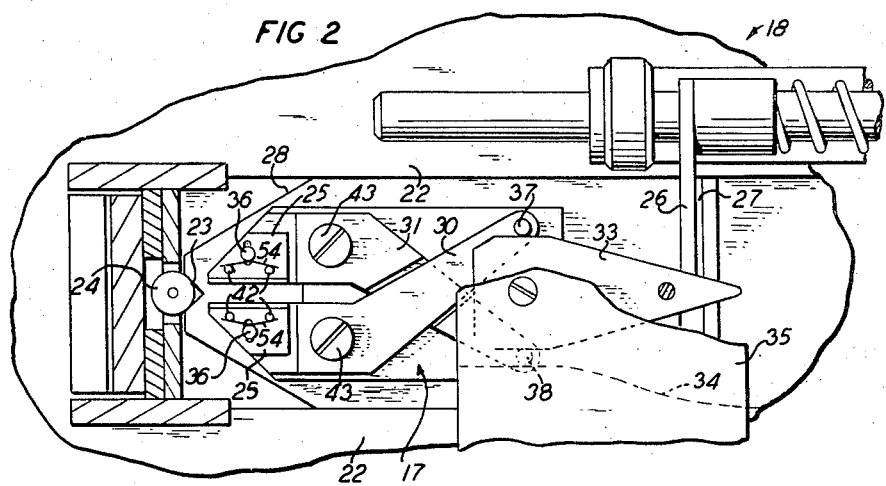
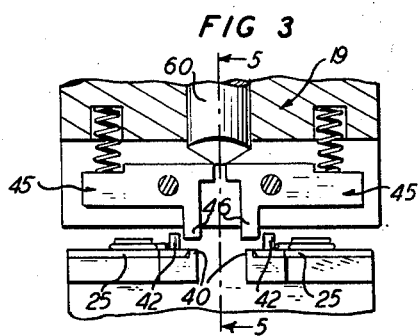
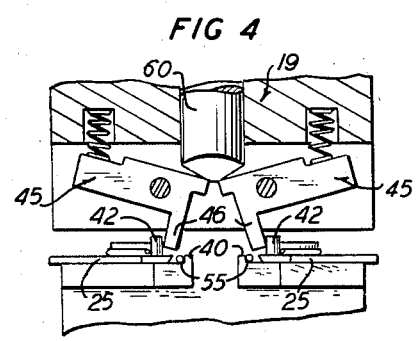

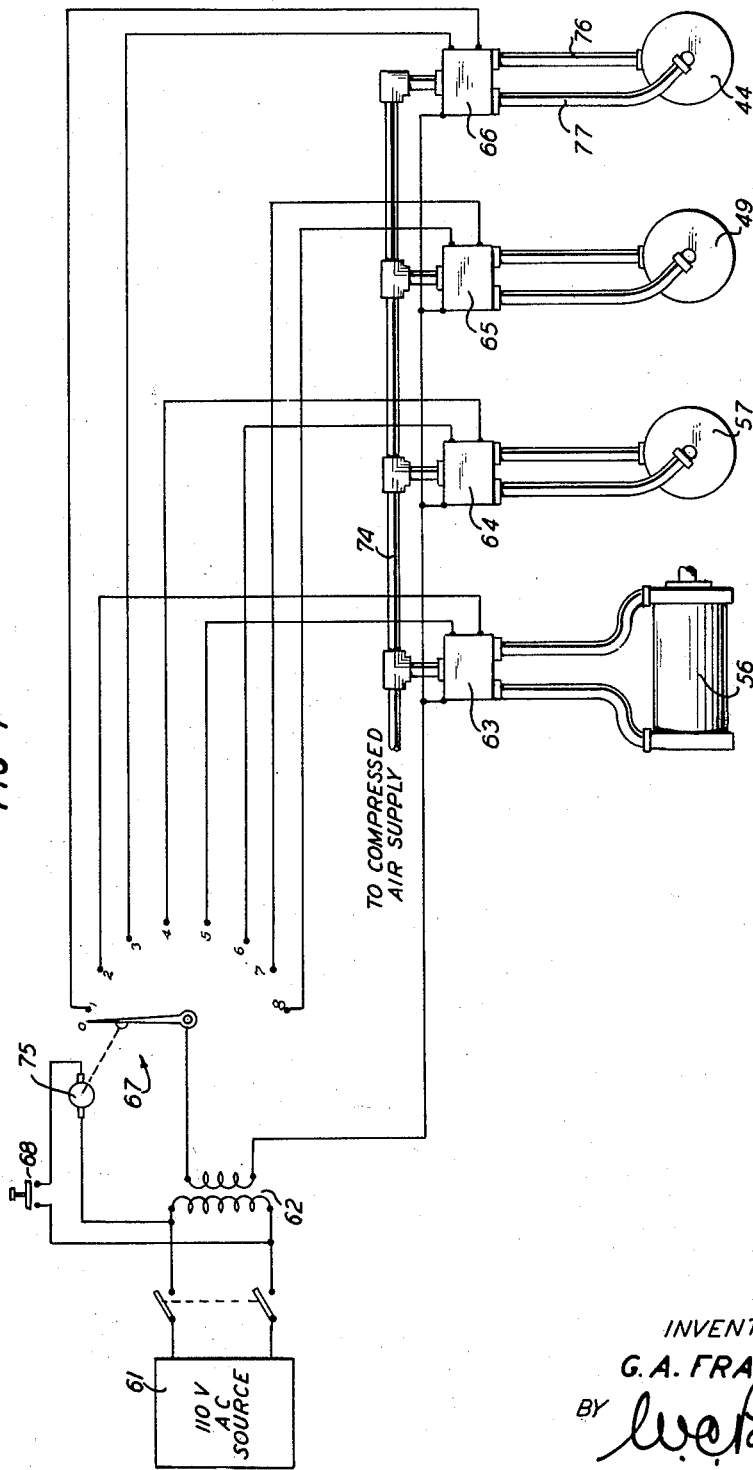

2,855,045
WIRE HANDLING APPARATUS

Gerard A. Frank, Allentown, Pa., assignor to Western Electric Company, Incorporated, New York, N. Y., a corporation of New York Application March 10, 1955, Serial No. 493,498

2 Claims. (Cl. 164—48)

This invention relates to wire handling apparatus and particularly to a fixture for handling fine contact wires such as are used in the manufacture of point contact semi-conductor devices.

It is the principal object of this invention to provide a fixture for loading wires of prescribed lengths into a wire holder which is removable from the fixture for subsequent processing of the wires.

In accordance with the general features of the invention a gripper mounted on a reciprocatable carriage pulls wires from supply spools and pushes them through a guide element into wire clamping jaws of a holder which is removably supported in a fixed loading position on the fixture and a cutter shears the clamped wires off to a prescribed length.

According to an important feature of the invention, a plurality of actuators are provided for automatically controlling the operation of the wire gripper, the wire clamping jaws of the holder and the cutter. In addition, a control circuit is provided for energizing the actuators in a desired sequence to perform the entire wire loading operation automatically.

These and other features of the invention will be more fully understood from the following detailed description taken in conjunction with the accompanying drawing, in which:

Fig. 1 is a side elevational view partially in section of a fixture according to the invention;

Fig. 2 is a fragmentary, plan view showing the details of the removable wire holder of Fig. 1;

Figs. 3 and 4 are views along the plane of line 3—3 of Fig. 1 showing the wire clamp releasing means in an inoperated and operated condition, respectively;

Fig. 5 is a view along the plane of line 5—5 of Fig. 3;

Fig. 6 is an end view of the wire gripper along the plane of line 6—6 of Fig. 1, and Fig. 7 is a schematic diagram of an automatic control circuit for the air cylinders of the fixture.

As seen in Fig. 1 of the drawing, in general the fixture consists of an arbor 11 on which wire supply spools 12 are mounted, a wire gripper 14 and a reciprocating mechanism 20 therefor for moving the gripper to pull wires 55 off the spools, an apertured guide element 15, a cutter 16, a removable wire holder 17, a spring clamp 18 for securing the holder in the fixture and wire holder jaw opening mechanism 19.

Referring now to Figs. 1 and 2 of the drawing, the wire holder 17 is positioned in ways 22 on the base 21 of the fixture, a V notch 23 being provided in the front end of the base plate 28 of the holder which cooperates with a fixed bearing or locating member 24 in the base 21 for accurately positioning the holder for receiving wires into jaws 25 on pivotally mounted arms 30 and 31. The arms 30 and 31 are friction loaded by their pivot screws 43 to resist rotation. The holder is secured against the bearing 24 by arm 26 of a conventional spring clamp 18, fitting into a slot 27 in the plate 28 of the holder. Two guide elements 34 (only one of which is shown in dashed lines in Fig. 2) and a corresponding intermediate element 33 on a fixed plate 35, supported by vertical members 32 extending from the fixture base 21, provide guide passages for pins 37 and 38 extending from the ends of the individually movable arms 30 and 31 to accurately position them, for receiving wires 55 into the jaws 25 thereof when the holder 17 is pushed into the ways 22. The jaws 25 are slotted and are slidably mounted on arms 30 and 31 by pins 36 which pass through the slots, springs 54 on pins 36 being tensioned against jaw pins 42 to hold the jaws against shoulders 40 (Figs. 3 and 4) of the arms.

The jaw opening mechanism 19 (Figs. 3, 4 and 5) is controlled by a double acting air cylinder 44 on apertured element 15, which when operated, depresses pivotally mounted members 45, the extensions 46 thereof engaging the pins 42 on the jaws to spread the jaws 25 open for receiving the wires between the bevelled edge of the jaws and the shoulders 40 as shown in Fig. 4. The members 45 are spring biased as shown in Fig. 3 to hold them against the actuator member 60 of the air cylinder 44 and the jaws 25 remain closed until the air cylinder is operated.

The wire guide element 15 consists of two apertured plates 72 and 73 and houses the cutter 16 which is spring biased and reciprocatable in a slot 48 between two pairs of funnelling apertures 58 and 59. A double acting air cylinder 49 for the cutter 16 is mounted to a bracket 50 on the base 21.

The gripper mechanism 14 comprises two pivotally mounted shoes 51 (Figs. 1 and 6) which are spring biased so that they normally engage each of a pair of wires 55 which are fed from the spools through apertures 52 in member 53, the wires being forced into friction contact with the top surface of member 53. Member 53 is connected to a plate 74 which is slidably positioned in guide members 70 on each side of the fixture and is also connected to the actuator of a double acting air cylinder 56 for reciprocating the entire gripper mechanism, including the double acting air cylinder 57 (for releasing the shoes 51) so that it may be advanced to the position shown in dashed lines in Fig. 1. In setting up for operating the fixture, wires from the spools must be threaded through the apertures 52 under the shoes 51 and through the first pair of apertures 58 in the guide element plate 72.

A control circuit for performing a desired automatic sequence of operations is shown in Fig. 7. This circuit is energized from a 110 volt 60 cycle source 61 and includes a step-down transformer 62, the secondary winding of which provides the operating voltage for a plurality of conventional electrically controlled air valves 63, 64, 65 and 66 for air cylinders 56, 57, 49 and 44 respectively. The air cylinders are all of the double acting type and the air valves have two windings which may be selectively energized to drive the cylinders in either of two opposite directions by applying compressed air from pipe 74 to either of two pipes connected between each cylinder and its control valve. A slow speed, motor driven selector switch 67, which is actuated by depressing a push button switch 68, which closes the energizing circuit for the driving motor 75, sequentially completes the energizing circuits for the valves so that they may be operated to perform the operating sequence which follows: On the first contact position of the switch 67 one winding of valve 66 is energized to operate the valve to admit air to cylinder 44 through pipe 76 to move the actuator member 60 of the cylinder to spread the jaws of the holder open; on the second position one winding of valve 63 is energized and similarly actuates cylinder 56 to advance the gripper whereby wires secured in the gripper and extending therefrom are pushed through the funnelling apertures 58 and 59 in members 72 and 73 into the open jaws 25 of the holder; in position 3 the other winding of valve 66 is energized, operating the valve to admit air to cylinder 44 through pipe 77, returning the cylinder to normal to release the jaws on the holder to clamp the wires therein; in position 4 valve 64 is operated to actuate cylinder 57 to release the gripper from the wires; in position 5 valve 63 operates, returning cylinder 56 to normal to retract the gripping mechanism to its original position as seen in Fig. 1; in position 6 air valve 64 operates, returning cylinder 57 to normal to permit the gripper to re-engage the wires preparing it for the next feeding operation; in position 7 air valve 65 operates to actuate cylinder 49 to drive the cutter 16 down to cut the wires and finally as the switch 67 is stepped to its last position, valve 65 is re-energized, returning cylinder 49 to normal to permit the spring biased cutter 16 to be returned to its raised position. After the wires have been cut the holder 17 is unclamped and removed from the fixture for further processing of the cut wires and another empty holder is inserted into the fixture for the next feeding operation. It will be noted that the cut supply wires extend through the first pair of apertures 58 in plate 72 so that the next time the gripper is moved forward, the wires will automatically be guided through apertures 59 in plate 73 into the jaws 25 of the empty holder.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In a fixture for automatically loading uniform lengths of wire in holders having clamping means for receiving the wire therein, means on the fixture for supporting such a holder, means for conditioning the clamping means of a holder in the support means for receiving wire fed thereto and for releasing the clamping means to clamp the wire therein, a movable carriage having a wire gripper thereon, spring biasing means for normally holding the gripper in friction engagement with wire extending therethrough and a fluid controlled actuator on the carriage and movable therewith for positively removing the gripper from the wire, a wire guide element, means for moving the carriage between a retracted and a wire advancing position for feeding wire secured in and extending therefrom through the guide element into the conditioned holder clamping means, means positioned between the carriage in its advanced position and a holder in the support means for cutting clamped wire to a prescribed length and means for sequentially controlling the operation of the actuator for the gripper, the carriage moving means, the conditioning means for the holder clamping means and cutting means so that the gripper is removed from the wire after it is clamped in the holder and the cutting means are actuated after the carriage is retracted and the gripper returned to engagement with the wire.

2. In a fixture for automatically loading uniform lengths of pairs of wires in holders having a pair of spaced jaws for receiving the wires, means on the fixture for supporting such a holder, means for conditioning the jaws of a holder in the support means for receiving wires fed thereto and for releasing the jaws to clamp the wires therein, a movable carriage having a pair of wire grippers thereon, spring biasing means for each of the grippers for holding the grippers independently in friction engagement with the wires, an actuator on the carriage and movable therewith for positively removing both grippers from the wires, a wire guide element with a pair of openings spaced apart to align wires extending therethrough with the jaws of a holder in the support, means for moving the carriage between a retracted and a wire advancing position for feeding wires secured in and extending therefrom through the openings in the guide element into the conditioned holder jaws, means positioned between the carriage in its advanced position and a holder in the support means for cutting clamped wires to a prescribed length and means for sequentially controlling the operation of the actuator for the grippers, the carriage moving means, the conditioning means for the jaws and cutting means so that the grippers are removed from the wires after they are clamped in the jaws of the holder and the cutting means are actuated after the carriage is moved to its retracted position and the grippers returned to engagement with the wires.

References Cited in the file of this patent
UNITED STATES PATENTS

| | | |
|---|---|---|
| 344,819 | Eckerson | July 6, 1886 |
| 883,126 | Wolfe | Mar. 24, 1908 |
| 1,078,202 | Keagy | Nov. 11, 1913 |
| 1,243,673 | Chatfield | Oct. 16, 1917 |
| 1,495,508 | Campbell | May 27, 1924 |
| 2,165,614 | Cook et al. | July 11, 1939 |
| 2,176,543 | Norton | Oct. 17, 1939 |
| 2,389,556 | Siegerist | Nov. 20, 1945 |
| 2,594,201 | Nasmith | Apr. 22, 1952 |
| 2,644,309 | Detrez | July 7, 1953 |
| 2,668,590 | De Witt et al. | Feb. 9, 1954 |